J. J. CHAPIN.
TYPE WRITER ESCAPEMENT MECHANISM.
APPLICATION FILED SEPT. 2, 1908.
1,123,244.
Patented Jan. 5, 1915.
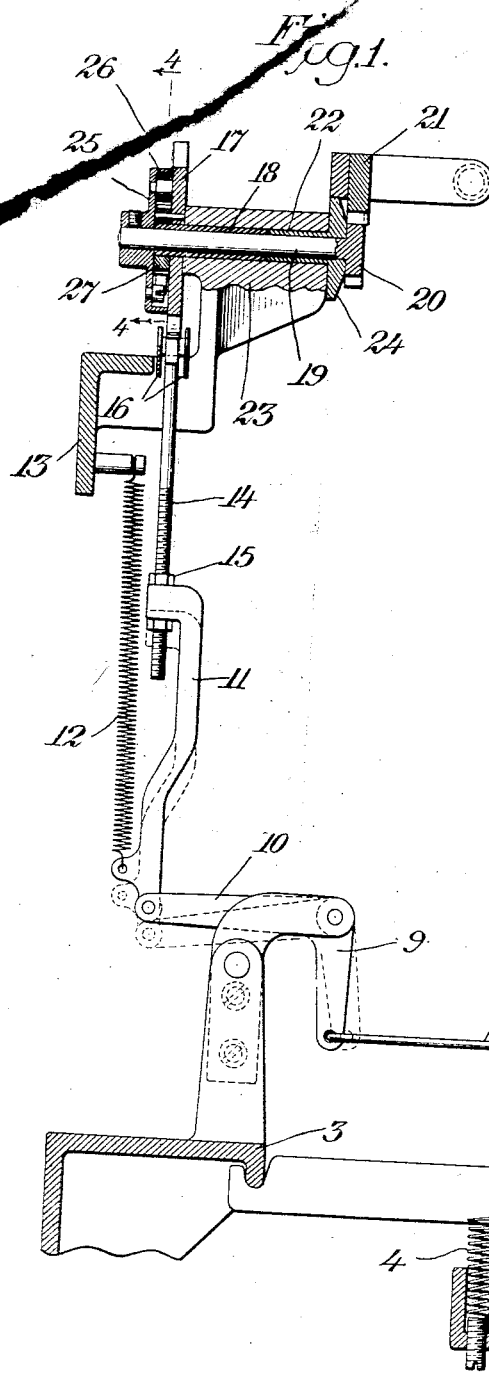
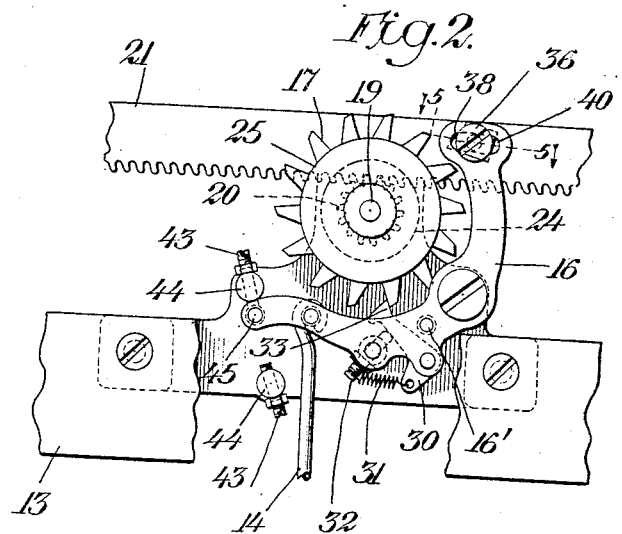
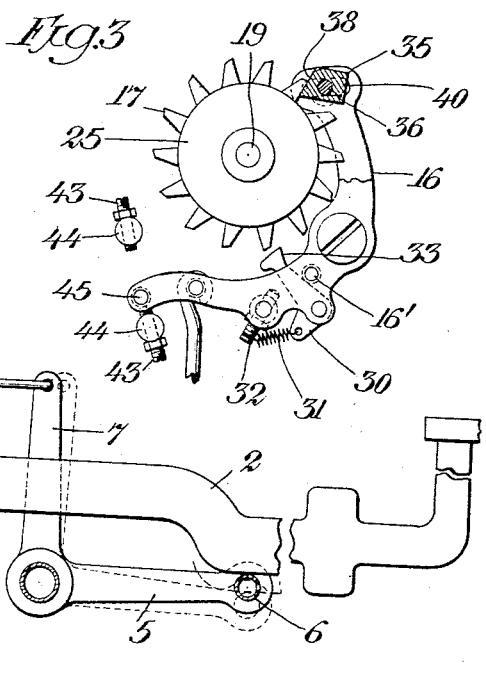
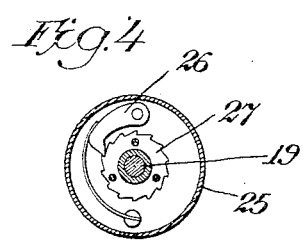
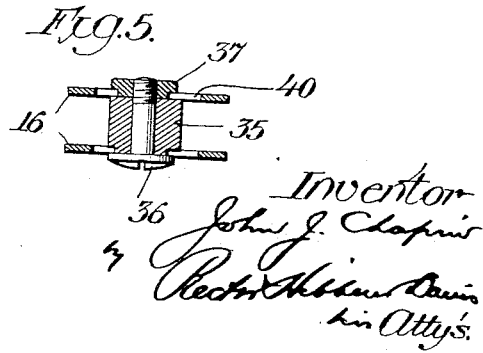
Witnesses:
R. Barrett
Louis B. Erwin
Inventor
John J. Chapin
by Rector Hibben Davis
his Attys.

UNITED STATES PATENT OFFICE.

JOHN J. CHAPIN, OF DETROIT, MICHIGAN, ASSIGNOR TO BURROUGHS ADDING MACHINE COMPANY, OF DETROIT, MICHIGAN, A CORPORATION OF MICHIGAN.

TYPE-WRITER ESCAPEMENT MECHANISM.

1,123,244.

Specification of Letters Patent.

Patented Jan. 5, 1915.

Application filed September 2, 1908. Serial No. 451,365.

*To all whom it may concern:*

Be it known that I, JOHN J. CHAPIN, a citizen of the United States, residing at Detroit, in the county of Wayne and State of Michigan, have invented certain new and useful Improvements in Type-Writer Escapement Mechanism, of which the following is a specification.

The present invention relates particularly to escapement mechanism for typewriting machines, such mechanism being adapted to control the step by step advance of the spring-drawn paper carriage.

The object is to provide an improved form of means for securing quiet and speedy action and capable of varying adjustments to divide the movement as best suited to the operator or if desired to have the entire movement take place in the downward stroke of keys or space bar or the reverse, *i. e.*, the entire movement to take place upon the rise of keys or space bar. Furthermore provision is made for advance of the carriage immediately setting in when the escapement starts its return to normal.

With these and incidental objects in view the invention consists in certain novel features of construction and combinations of parts the essential elements whereof are recited in the appended claims and a preferred form of embodiment of which is illustrated in detail in the accompanying drawings and specifically described hereinafter.

Of said drawings Figure 1 represents in sectionalized side elevation certain portions of a typewriting machine including the escapement mechanism and connections for operating the same; Fig. 2 represents the escapement mechanism in rear elevation in normal condition; Fig. 3 is a somewhat similar view illustrating changed relations of parts due to depression of a key or the space bar; Fig. 4 is a detail cross section on the line 4—4 of Fig. 1; and Fig. 5 is a detail section on the line 5—5 of Fig. 2.

In said drawings the reference numeral 2 designates a key lever fulcrumed on the base frame-work 3 and upheld by a spiral spring 4. A universal bail underlies the keys, said bail comprising arms, one of which is shown in Fig. 1 designated by the numeral 5, and a cross rod 6, the bail has a central upstanding arm 7 which is connected by a link 8 with the depending arm of a bell crank 9 pivoted on a suitable standard and having a rearwardly-extending arm 10. The latter is coupled to an upwardly extending bar 11 connected by a spring 12 with an over-head portion of the framework 13. The upper end of said bar is formed into an eye through which extends a screw-threaded rod 14 carrying adjusting nuts 15 above and below said eye. Said rod connects with an escapement lever 16 of substantially bell crank form and coöperating in a manner hereinafter described with an escapement wheel 17. The latter is loosely mounted upon a sleeve 18 (Fig. 1) which surrounds a shaft 19, the latter carrying a pinion 20 in mesh with the escapement rack 21 which is mounted upon the paper carriage in the usual or any suitable manner. The sleeve 18 and a second sleeve 22 are supported by a suitable bearing 23 on the framework, said sleeve 22 carrying a plain roller 24 upon which a flange of the escapement rack rests. There is secured to the rear end of the shaft 19 a drum 25 carrying a spring-pressed pawl 26 (Fig. 4) which engages a ratchet wheel 27 secured to the escapement wheel 17.

Reverting to the escapement lever 16 this is preferably composed of duplicate plates separated by suitable spacing collars and riveted together. It is pivoted at the angle of the bell crank to a bracket on the framework and carries pivoted between ears formed upon such duplicate plates a dog 30 connected by a light spring 31 with a screw stud 32. The latter engages a tapped opening in one of the rivets connecting the plates of the lever 16 and constitutes a back stop for said dog. The latter is formed with a beveled lip 33 which normally engages one of the teeth of the wheel 17 to hold the paper carriage stationary.

The pivot of the bell crank lever 16 is located substantially in a line tangential of the wheel 17 and embracing the end of the tooth which is normally bearing against the lip 33 and normally the arm of said bell crank lever which carries this pivoted dog lies substantially horizontal as shown in Fig. 2. The before-mentioned rod 14 is hooked over a rivet of the lever 16 in this horizontal arm and it will be obvious that depression of a key lever, which through the connections already described draws down said rod 14, will thereby result in rocking the lever 16, drawing the dog 30 downward. The other arm of said lever stands normally about vertically and at the upper extremity carries a dog 35 which is clamped between the plates by means of a screw 36 and a nut 37, see Fig. 5. This fixed dog is in the shape of a block which has an acting face 38 adapted upon movement of the lever 16, such as already mentioned, to move into the path of an approaching tooth of the wheel 17. Of course this fixed dog is to carry its acting face into such position before the loose or pivoted dog 30 lets go the tooth it has been engaging. Now the upper arm of the lever 16 extends considerably beyond a horizontal plane embracing the axis of the escapement wheel and the location of the fixed dog is such that its line of traverse causes the acting face 38 to move toward and from the acting face of the approaching or engaged tooth. This acting face is formed on such an angle as to correspond with the face of such approaching or engaged tooth as shown in Fig. 3. Consequently, when the escapement lever starts to return the movement of the escapement wheel can at once set in for the acting face of the fixed dog is moving away from the face of the engaged tooth. Meantime the pivoted dog 33, which under the impulse of its spring 31 has jumped past the normally engaged tooth, will move up into the path of the next tooth and stop the wheel when it has been released by the permanent dog.

Besides the adjustment provided by the nuts 15 by which to determine the period of engagement between the key levers and the bail 5—6, adjustments are provided for both the loose dog and the fixed dog. Mention has already been made of the screw stud 32 which constitutes an adjustable back stop for the pivoted dog. In addition to this the fixed dog is rendered adjustable by forming slots 40 in the plates of the upper arm of the lever 16 (Figs. 2 and 5) and a reduced portion of the block 35 fits one of these slots while a reduced portion of the nut 37 fits the other. Said slots extend in the line of movement of the fixed dog and provide for its adjustment at varying distances from the confronting tooth. Hence the dog can be adjusted to provide for stopping the escapement wheel at various points. Its extreme adjustment toward the wheel would cause it to prevent any appreciable advance of the wheel upon depression of a key lever because by the time the loose dog let go the normally engaged tooth the fixed dog would be against the confronting tooth. The other extreme adjustment of the fixed dog and the extreme advance of the back stop stud for the loose dog would provide for practically the complete advance of the wheel taking place upon disengagement of the pivoted dog from the wheel, i. e., upon depression of the key lever. It will be obvious that various intermediate adjustments can be obtained according to what sort of action of the escapement mechanism may be desired. When the last-mentioned extreme adjustment is not employed but only a portion of the advance is to take place upon the rise of the key lever, such advance is not delayed until the fixed dog disengages from the tooth of the wheel but starts immediately upon release of the key lever as already explained. It will be seen therefore that the carriage gets well under way while the fixed dog is disengaging and any continued movement after the disengagement can be made extremely small so as to practically eliminate any shock or noise due to the encounter of the wheel with the loose or pivoted dog. The latter is formed at its outer end on such an angle or curve as to instantly snap past the end of the tooth the moment the face of the lip 33 moves off the face of the tooth. A rivet 16' of the lever 16 constitutes a front stop for this pivoted dog holding the edge of its lip 33 at the circumference of the escapement wheel tooth as illustrated in Fig. 3. Further adjustment is provided for by entering set screws 43 through studs 44 on the supporting bracket, such set screws regulating the vibration of the escapement lever 16 whose end rivet 45 is adapted to abut said set screws. To facilitate disengagement of the dog lips from the teeth of the escapement wheel the acting faces of these teeth are made slightly tangential and not radial of the wheel.

It will be seen that the above-described construction is well calculated to fulfil the objects primarily stated but it is to be understood that this construction is susceptible of modification within the scope of the invention.

What I claim is:

1. A typewriter escapement mechanism comprising a toothed wheel, a bell crank having its pivot close to the periphery of the wheel and having its arms extending in opposite directions from its pivot and in close proximity to the wheel, a stepping pawl carried by one arm and engaging the teeth of the wheel near the point of tangency with the wheel of a line drawn through the pivot of the bell crank and a holding pawl on the other arm of the bell crank engaging the wheel at a point materially beyond the point of tangency with the wheel of a line drawn through the pivot of the bell crank.

2. A typewriter escapement mechanism comprising a toothed wheel, a bell crank having its pivot close to the periphery of the wheel and having its arms extending in opposite directions from its pivot and in close proximity to the wheel, a pivoted spring-held stepping pawl carried by one arm and engaging the teeth of the wheel near the point of tangency with the wheel of a line drawn through the pivot of the bell crank and a holding pawl on the other arm of the bell crank engaging the wheel at a point materially beyond the point of tangency with the wheel of a line drawn through the pivot of the bell crank.

3. A typewriter escapement mechanism comprising a toothed wheel, a bell crank having its pivot close to the periphery of the wheel and having its arms extending in opposite directions from its pivot and in close proximity to the wheel, a stepping pawl carried by one arm and engaging the teeth of the wheel near the point of tangency with the wheel of a line drawn through the pivot of the bell crank and a holding pawl on the other arm of the bell crank engaging the wheel at a point materially beyond the point of tangency with the wheel of a line drawn through the pivot of the bell crank, said holding pawl adjustable substantially in the line of its movement.

4. A typewriter escapement mechanism comprising a toothed wheel, and a bell crank having its pivot close to the periphery of the wheel, one arm of the bell crank carrying a stepping pawl at the point of tangency to the wheel of a line drawn through the pivot of the bell crank and its other arm carrying at a point beyond the point of tangency to the wheel of a line drawn through the pivot of the lever a fixedly mounted dog with an acting face located to advance toward the face of the approaching tooth of the wheel to intercept the same and in reverse rocking of the machine to recede from the face of said tooth permitting immediate movement of the wheel, said fixedly mounted dog being adjustable in the line of its movement toward and from the wheel.

5. A typewriter escapement comprising a toothed wheel; a bell crank composed of a pair of spaced plates; a dog pivoted between said plates on one side of the pivot of the bell crank and spring-drawn to engagement with a tooth of the wheel; and a dog mounted between the plates on the other side of the bell crank pivot, the plates being slotted transversely and the last-mentioned dog held in place by bolt and nut engaging said slots.

6. A typewriter escapement mechanism comprising a toothed wheel, and a bell crank carrying on one side of its pivot a pivoted spring-held dog normally in engagement with a tooth of the wheel and on the other side of its pivot a fixedly mounted dog with an acting face located to advance toward the face of the approaching tooth of the wheel to intercept the same and in reverse rocking of the lever to recede from the face of said tooth permitting immediate movement of the wheel, said fixedly mounted dog being adjustable on the bell crank substantially in the line of its movement, and an adjustable back-stop for the pivoted dog.

7. A typewriter escapement mechanism comprising a toothed wheel and a bell crank pivoted close to the periphery of the wheel carrying on one side of its pivot, substantially at the point of tangency of a line from the pivot of the lever to the wheel, a pivoted spring-held stepping dog and on the other side of its pivot at a point materially beyond the point of tangency of a line through said pivot to the periphery of the wheel a fixedly mounted dog with an acting face located to advance toward the face of the approaching tooth of the wheel to intercept the same and in reverse rocking of the lever to recede from the face of said tooth permitting immediate movement of the wheel, said dog being adjustable on the bell crank substantially in the line of its movement toward and from the wheel and adjustable stops for the crank.

8. A typewriter escapement mechanism comprising a toothed wheel, and a bell crank carrying on one side of its pivot a pivoted spring-held dog normally in engagement with a tooth of the wheel and on the other side of its pivot a fixedly mounted dog with an acting face located to advance toward the face of the approaching tooth of the wheel to intercept the same and in reverse rocking of the lever to recede from the face of said tooth permitting immediate movement of the wheel, said fixedly mounted dog being adjustable on the bell crank substantially in line of its movement, an adjustable back-stop for the pivoted dog, and adjustable stops for the bell crank.

9. A typewriter escapement mechanism comprising a toothed wheel, and a bell crank carrying on one side of its pivot a pivoted spring-held dog normally in engagement with a tooth of the wheel and on the other side of its pivot a fixedly mounted dog with an acting face located to advance approximately in the line of advance of the approaching tooth of the wheel to intercept the same and in reverse rocking of the lever to recede from the face of said tooth approximately in the line of movement of the latter permitting immediate movement of the wheel, said acting face of the dog corresponding angularly with the face of the tooth.

10. A typewriter escapement mechanism comprising a toothed wheel with teeth slightly inclined to the radial on their advancing faces, and a bell crank carrying on one side of its pivot a loose dog spring held to engage with the tooth of the wheel, and on the other side of its pivot a permanent dog with an acting face located to advance approximately in the line of advance of the approaching tooth of the wheel to intercept the same, and in reverse rocking of the lever to recede from the face of said tooth approximately in the line of movement thereof, permitting immediate movement of the wheel when the bell crank is vibrated.

JOHN J. CHAPIN.

Witnesses:
J. G. VINCENT,
R. S. MIELERT.